United States Patent
Hellberg (10) Patent No.: US 9,862,120 B2
(45) Date of Patent: Jan. 9, 2018

(54) CUTTING OR SAWING MACHINE

(75) Inventor: Tommy Hellberg, Göteborg (SE)

(73) Assignee: HUSQVARNA AB, Huskvarna (SE)

( * ) Notice: Subject to any disclaimer, the term of this patent is extended or adjusted under 35 U.S.C. 154(b) by 216 days.

(21) Appl. No.: 12/747,634

(22) PCT Filed: Dec. 13, 2007

(86) PCT No.: PCT/SE2007/001101
§ 371 (c)(1),
(2), (4) Date: Jul. 26, 2010

(87) PCT Pub. No.: WO2009/075612
PCT Pub. Date: Jun. 18, 2009

(65) Prior Publication Data
US 2010/0299944 A1 Dec. 2, 2010

(51) Int. Cl.
*B23D 45/16* (2006.01)
*B27B 5/08* (2006.01)
*B28D 1/04* (2006.01)
*B23D 45/00* (2006.01)

(52) U.S. Cl.
CPC ........... *B28D 1/048* (2013.01); *B23D 45/003* (2013.01); *B23D 45/16* (2013.01); *B23D 45/165* (2013.01); *B27B 5/08* (2013.01)

(58) Field of Classification Search
CPC .... B23D 45/165; B23D 45/003; B23D 45/16; B28D 1/045; B28D 1/048; B28D 1/046; B27B 5/08; B27B 9/00; B27B 9/02; B27B 9/04; B27G 19/04
USPC .......................... 30/391, 390; 125/13.01, 20
See application file for complete search history.

(56) References Cited

U.S. PATENT DOCUMENTS

| 2,610,658 A | * | 9/1952 | Koeling ........................... 30/373 |
| 2,741,282 A | * | 4/1956 | Wieting ...................... 144/136.1 |
| 2,982,320 A | * | 5/1961 | Trumbull et al. ............... 30/373 |
| 3,111,969 A | * | 11/1963 | Bivens ........................... 30/373 |
| 3,583,106 A |   | 6/1971 | Dobbertin |
| 3,656,468 A | * | 4/1972 | Welden ...................... 125/13.01 |

(Continued)

FOREIGN PATENT DOCUMENTS

| WO | WO 2006/101423 | * | 9/2006 |
| WO | 2009075612 A1 |   | 6/2009 |

OTHER PUBLICATIONS

International Search Report, International Application No. PCT/SE2007/001101, dated Aug. 15, 2008, pp. 1-3.

(Continued)

*Primary Examiner* — Clark F Dexter
(74) *Attorney, Agent, or Firm* — McNair Law Firm, P.A.

(57) ABSTRACT

A preferred embodiment of a hand-operated flush cutting machine includes a front section with a first and a second disc shaped cutter blade which are rotary about an axis of rotation and mounted in the front end of an elongated tool carrier having the substantial shape of a flat bar. The tool carrier is mounted to a rear section of the machine. The rear section is provided with a number of components, including a motor for driving the cutter blades via a power transmission as well as handles and a control for operating the machine. The first, right hand side cutter blade has a first side, which does not face the second cutter blade. The first side defines a first plane which does not intersect any component in the front or rear sections.

16 Claims, 8 Drawing Sheets (56) References Cited

U.S. PATENT DOCUMENTS

| | | | |
|---|---|---|---|
| 5,784,789 A * | 7/1998 | Vargas | 30/388 |
| 8,413,645 B2 * | 4/2013 | Donnerdal et al. | B23D 47/12 125/13.01 |
| 2002/0166244 A1 * | 11/2002 | Williams | 30/388 |
| 2006/0156877 A1 * | 7/2006 | Plonsky et al. | 83/13 |
| 2007/0221188 A1 | 9/2007 | Donnerdal et al. | |
| 2009/0199835 A1 * | 8/2009 | Donnerdal et al. | B23D 47/12 125/13.01 |
| 2009/0229436 A1 * | 9/2009 | Crain et al. | 83/373 |
| 2012/0204430 A1 * | 8/2012 | Crain et al. | 30/371 |

OTHER PUBLICATIONS

International Preliminary Report on Patentability, International Application No. PCT/SE2007/001101, dated Feb. 5, 2010, pp. 1-8.

* cited by examiner

CUTTING OR SAWING MACHINE

TECHNICAL FIELD

The present invention relates to a lightweight flush-cutting or sawing machine which is designed to be operated hand-held. In spite of its low weight and small size, however, the machine is also useful for cutting even thick concrete walls, roofs, floorings or pillars as well as for performing special tasks, including cutting narrow grooves in concrete floors or walls, flush against walls and floors, respectively. The machine of the invention therefore is a versatile utensil intended in the first place for the construction industry.

BACKGROUND OF THE INVENTION

Flush cut sawing is conventionally performed by means of heavy machines, which typically are carried by wheeled vehicles or by carriers on rails or the like, which make them cumbersome to install and often also to handle. Another drawback, besides that they typically are expensive, is that they are special-type machines, which have only a restricted field of use. However, also more simple and less expensive, light, hand-held and hand-operated flush-cutting machines are known in the art, such as angle grinding machines. Such machines, on the other hand can cut only to quite small depths, and are not very efficient cutters either. Besides, they have typically drawbacks from an ergonomic point of view. Therefore, for these and other reasons, there exists a need for flush cut sawing or cutting machines which do not have the mentioned or other serious drawbacks or shortcomings.

BRIEF DISCLOSURE OF THE INVENTION

It is the objective of the invention to address the above mentioned problems. More specifically, it is a main objective of the invention to provide a cutting or sawing machine which
has excellent flush cut properties,
has so low weight that it can be hand-held and operated by an operator single-handed, and
satisfies high requirements from an ergonomic point of view, including small risk for kick backs or other behaviours of a hazardous nature.

It is also a purpose of the invention to provide a machine which can be used not only for flush-cutting but more or less as a universal cutting machine on a building site, including for cutting even thick walls, floors, ceilings or pillars of concrete, bricks or other building materials. A special, and probably unique task which the machine should be able to perform readily is to cut narrow grooves in floors, walls or ceilings, flush against walls, ceilings or floors.

These and other objectives can be achieved therein that the machine is characterized by what is stated in the independent patent claim. Other features and objectives are apparent from the dependent claims and from the following detailed description of a preferred embodiment of the invention.

BRIEF DESCRIPTION OF DRAWINGS

In the following description of a preferred embodiment of the invention, reference will be made to the accompanying drawings, in which.

DESCRIPTION OF A PREFERRED EMBODIMENT

With reference first to FIG. 1-FIG. 4, a machine of the invention is generally designated 1. Its main parts are an elongated rear section 2, an elongated front section 3, and a mid section 4 of short length. The rear section in turn consists of a rear main portion 5 and a front portion 6 of shorter length. The basic design of the front section 3 is known per se through the International Publication WO 2006/101423, the disclosure of which is herewith incorporated in the present description by reference, and includes an elongated tool carrier 11, two circular, rotary cutter blades 7 and 8, one on each side of the tool carrier 11, and upper and lower front blade guards 9, 10. A plane of symmetry of the front section 3, perpendicular to an axis of rotation 26 of the cutter blades 7 and 8, is designated 14, FIG. 5. The mid section 4 includes a shield 12 protecting the rear section 2 of the machine. A front handle 13 is provided in the rear end of said front portion 6 of the rear section 2. A rear blade guard 15 is pivotally connected to the shield 12 such that it can be folded up against the shield in the mid section 4 and is also provided displaceable in lateral directions allowing flush-cutting as well as normal, non-flush-cutting operations of the machine, as will be explained more in detail in the following.

Figure 1:
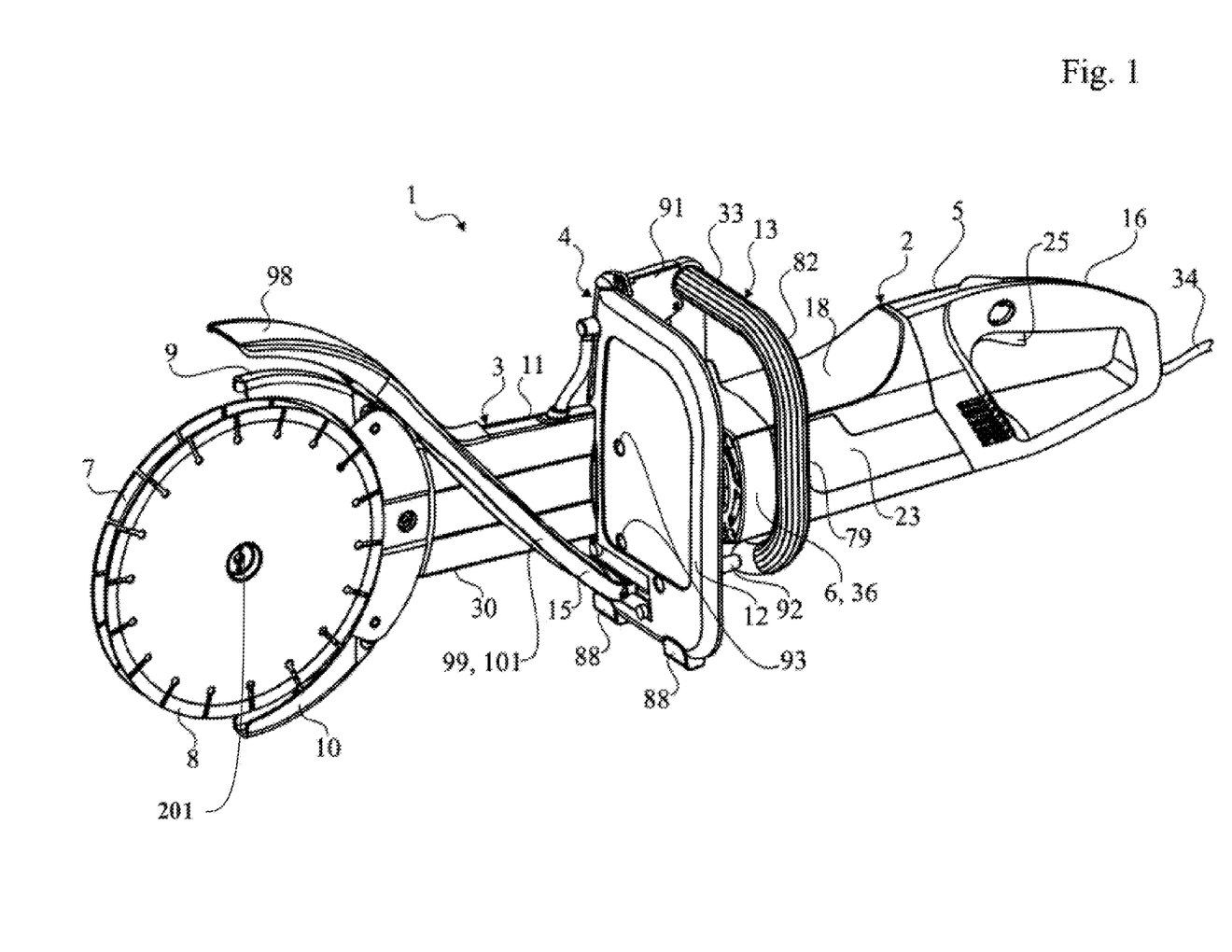
FIG. 1 is a perspective view of the machine according to the preferred embodiment of the invention showing the top, left hand side and the front as viewed obliquely from above, front and left.
Figure 2:
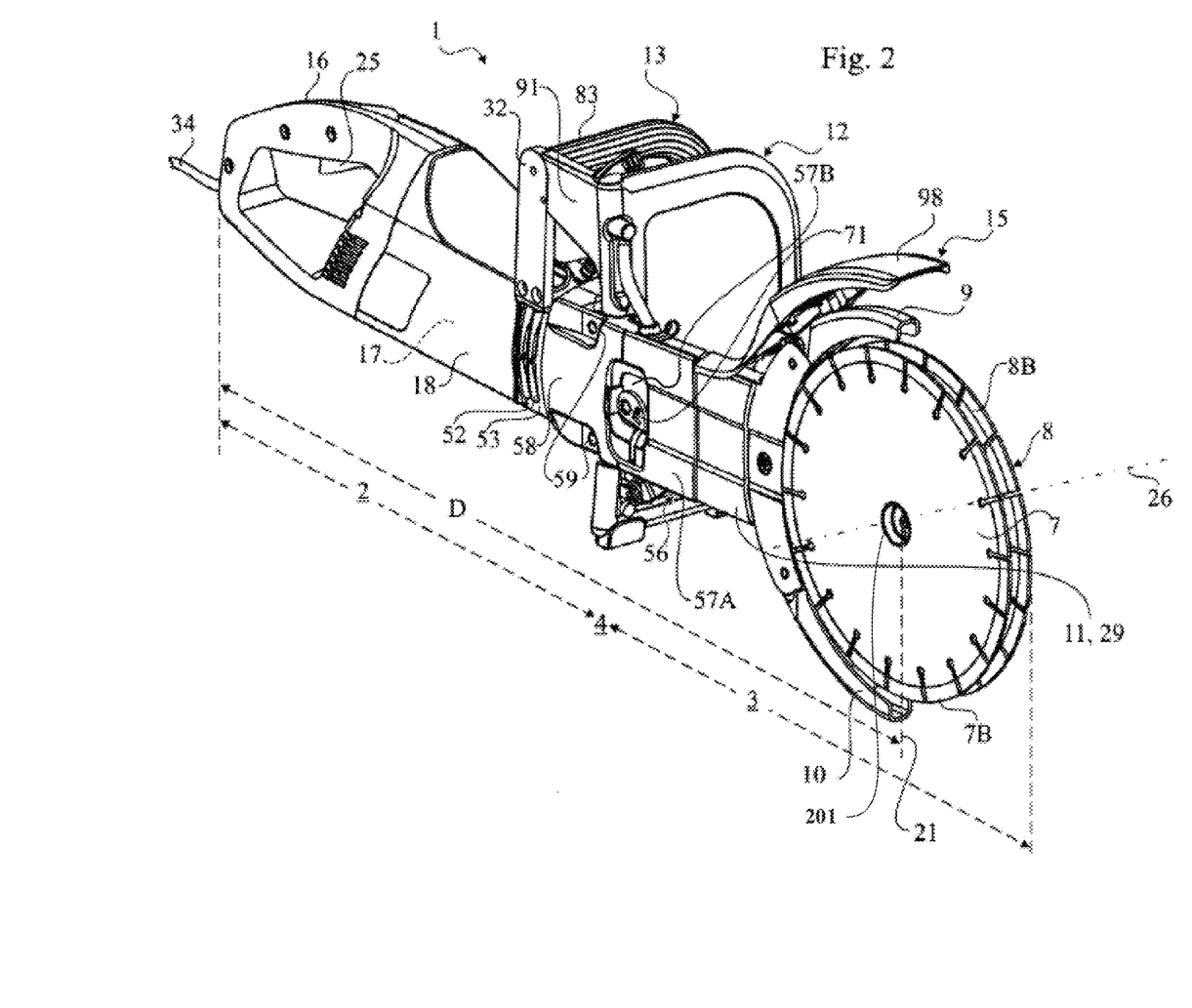
FIG. 2 shows the opposite side of the machine obliquely from the front.
Figure 3:
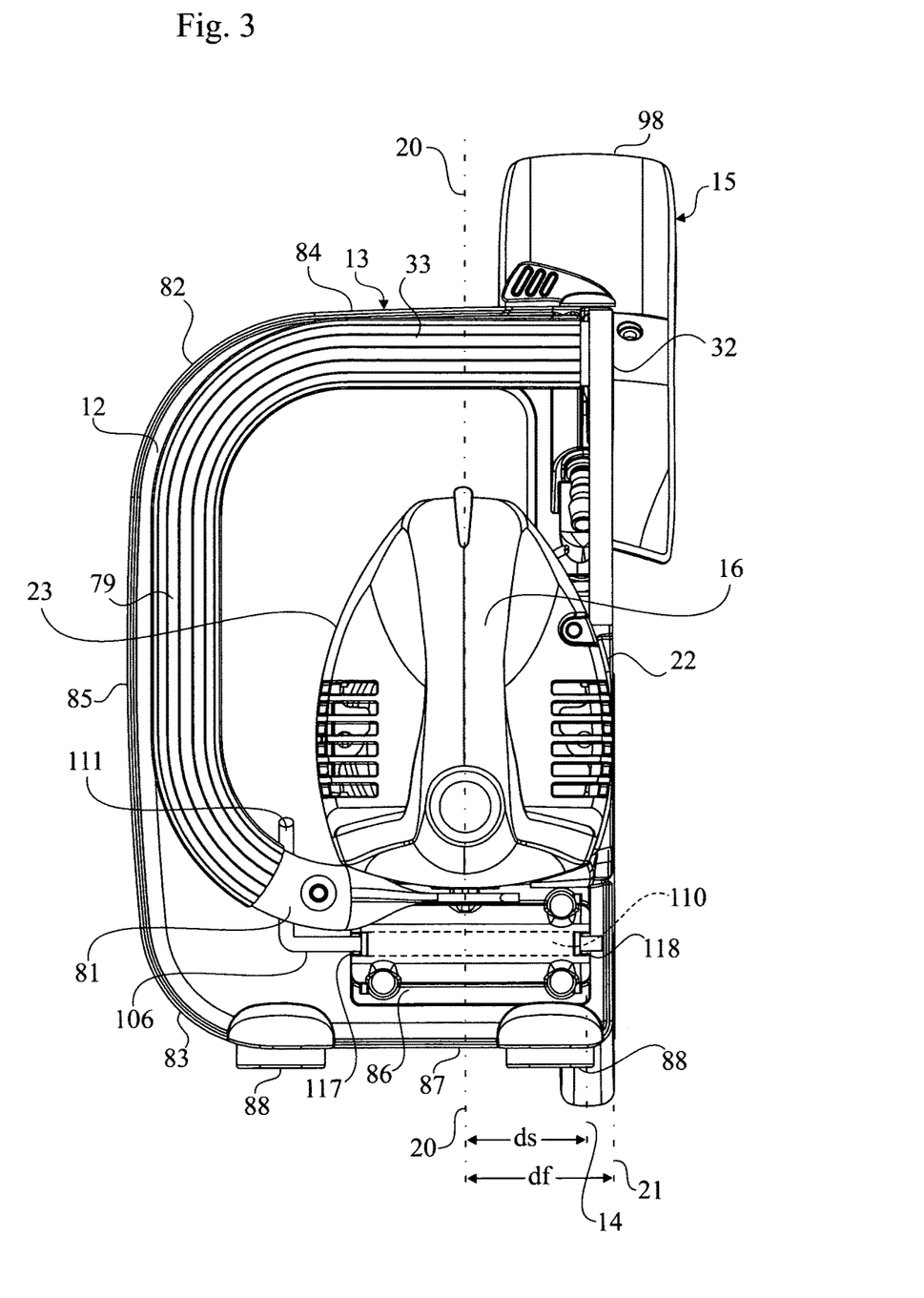
FIG. 3 is a rear end view of the machine.
Figure 4:
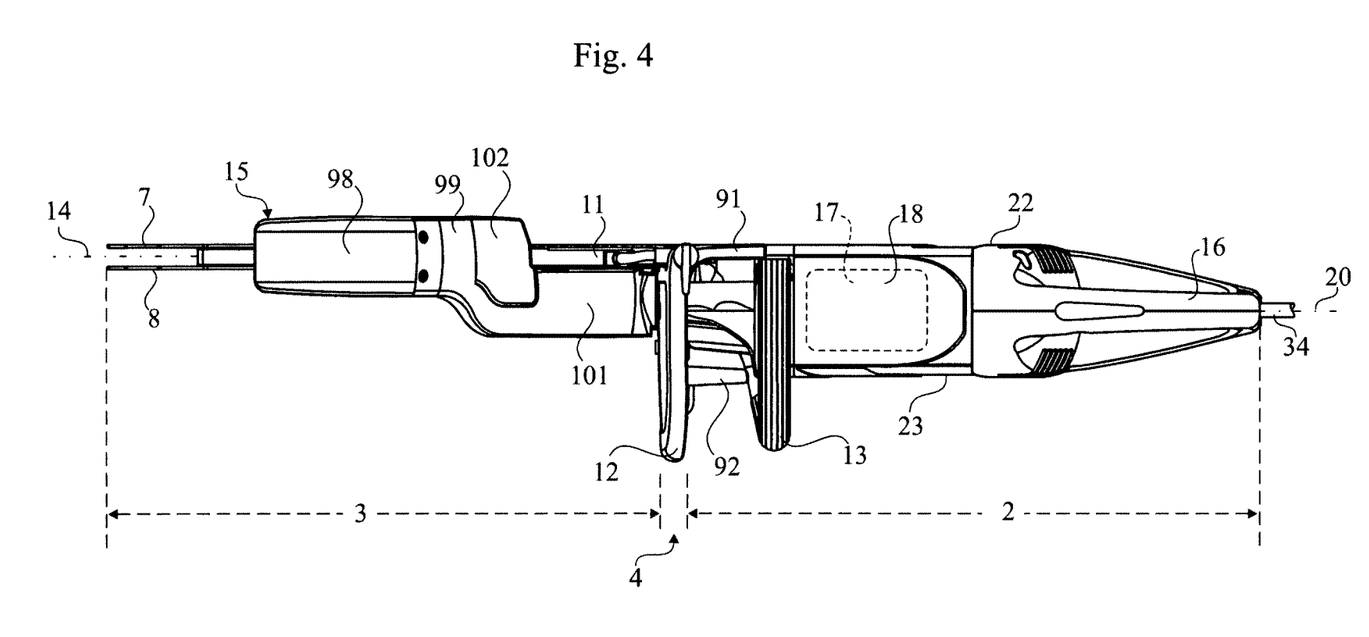
FIG. 4 is a top view of the machine provided with two circular cutting tools and prepared for non-flush-cutting.

In the rear section, an elongated rear handle is designated 16. An electric motor 17, schematically shown in FIG. 8 and indicated by dashed lines in FIG. 4, is accommodated in a motor housing 18 to the rear of said front portion 6. A control device 25 for operating the motor 17 is provided in a manner known per se in connection to the rear handle 16. A not shown stator shell of the motor 17 has a substantially circular-cylindrical outer shape and is attached to the motor housing 18, substantially filling the space that is available inside the rounded right and left hand side walls 22, 23 of the motor housing 18 in the rear main portion 5 of the rear section 2. The axis of rotation 19 of the motor 17 and of a motor shaft 24 extends in the longitudinal direction of the machine 1 and coincides with a central plane 20 of symmetry of the rear main portion 5 of the machine 1, which means that the rear main portion 5, which includes the driving motor 17 is well balanced. Said plane 20 is a vertical plane when the machine 1 has adopted the position shown e.g. in FIG. 3, which hereinafter by definition is referred to as the normal position of the machine, although the machine can be operated in any conceivable position. An electric cable 34 is connected to the rear end of the machine 1.

As is clearly shown in the drawings, the rear section 2 has a very slender design, which is made possible due to the shape and provision of the motor 17. The slender design, although known per se in the art, is of significant importance for the achievement of the desired ergonomic features of the machine 1, because it makes a short distance ds from the central plane of symmetry 20 of the rear main portion 5 of the rear section 2 to the plane of symmetry 14 of the front section 3 and also a short distance df to a flush-cutting plane 21 of the machine 1 possible, FIG. 3. The good balance of the machine 1 also promotes a safe cutting.

In the front section 3, the two coaxial cutter blades 7 and 8, which both are flush-cutting type of cutter blades, are rotary about an axis of rotation 26. Each cutter blade 7, 8 consists of a flat blade body 7A and 8A, respectfully, made of steel and peripheral diamond segments 7B and 8B which are the working parts of the cutter blades. The outer side, i.e. the side opposite the side facing the tool carrier 11, of the right hand side cutter blade 7, more specifically the outer side of the blade body 7A, defines a plane, which may be referred to as a first plane 21. The diamond segments 7B and 8B are slightly thicker than the blade bodies 7A and 8A. They therefore protrude slightly beyond the planes of the blade body sides, which means that e.g. the outer sides of the diamond segments 7B on the right hand side cutter blade defines an outer plane at a very short distance from said first plane 21. This is important for an efficient operation of the cutter blade, and it also gives a certain play which the operator can take advantage of when performing flush cut operations, but in other respects the difference between the two planes, which amounts to only a few tenths of a millimeter, can be neglected. The said first plane 21 therefore with good accuracy corresponds to said flush-cutting plane 21.

The flush-cutting plane 21 also coincides with a plane of the outer surface of a support member 32 which forms part of the front handle 13, connecting a top section 33 of the front handle 13 with the main body of the rear section 2 of the machine 1. It is also in plane with wall section 53, right hand side wall of tool carrier 11, and right hand side wall 22 of rear main portion 5. When cutting e.g. into a wall flush against the floor in order to establish a door opening without any threshold, or cutting a pillar without leaving any rest, not even a very short stump above the floor surface, the operator may contact said support member 32, and the other of said members in plane with the said support member, lightly against the floor, which promotes a correct and safe flush cutting. The support member 32 in other words aids the operator for the achievement of a desired flush cut.

Figure 8:
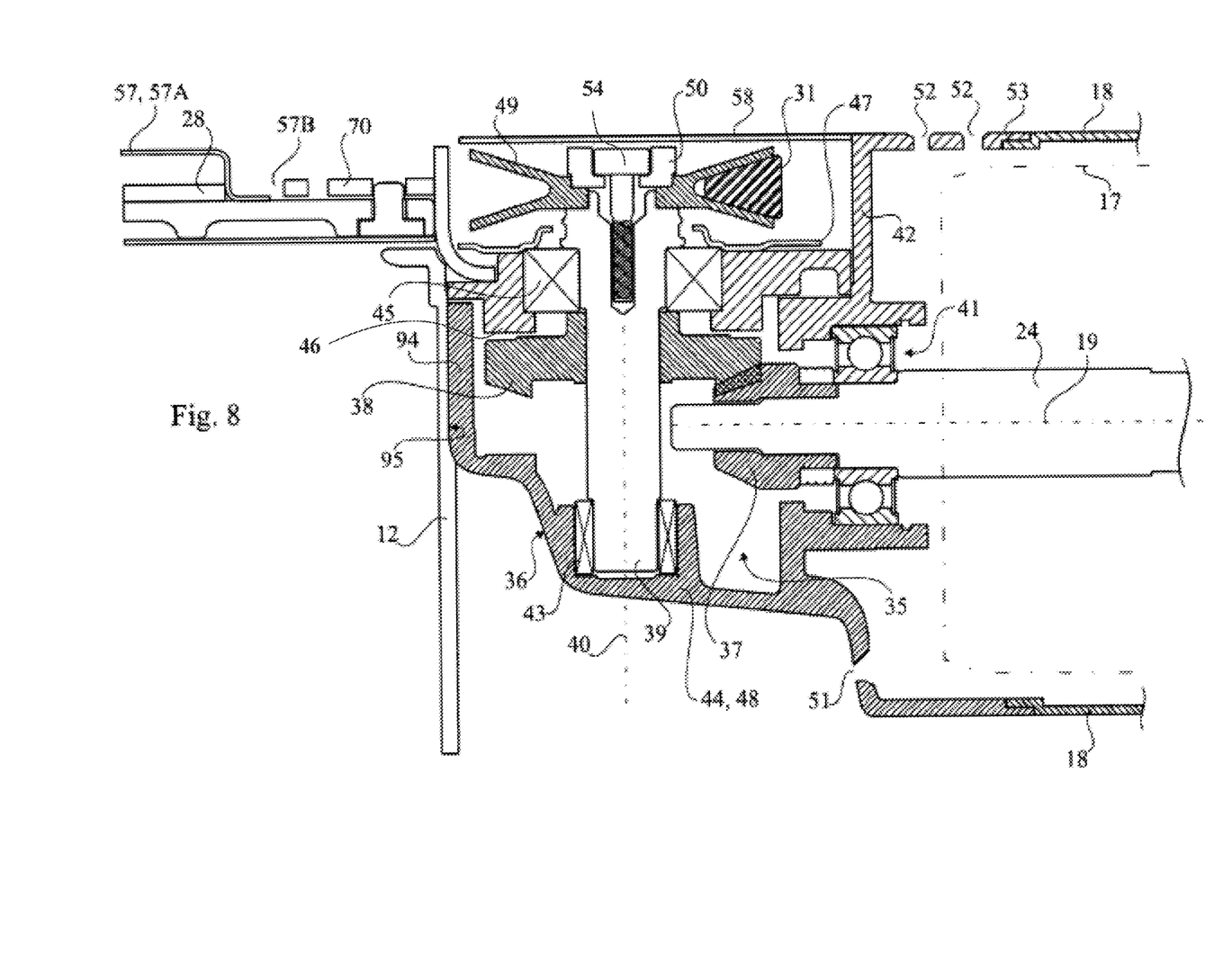
FIG. 8 shows parts of a power transmission, a gear housing and a rear portion of a tool carrier in cross section in a plane defined by the axes of rotation of a driving motor and rear driving pulley.

As mentioned in the foregoing, the basic design of the front section 3 which is employed in the machine 1 belongs to prior art and does not form part of the present invention per se. Therefore it will not be described here in any detail. However, it might be stated that the tool carrier 11 includes a bar 28 of solid steel, the rear end of which is shown in FIG. 8. The bar is covered by panels 29, 30 made of thin steel sheet and in its front end the bar is provided with two driving wheel halves 201, one on each side of the bar, which are connected with one another by a shaft, which is journalled in the bar 28, such that the driving wheel halves in combination form a front driving wheel for the rotation of the cutter blades 7 and 8, which are secured to the driving wheel halves 201. Both cutter blades are flush-cutting blades, which means that no part of the cutter blades protrudes beyond the side planes defined by the edge segments 7A and 8B. A V-belt 31 is employed, powered by the motor 17, for the rotation of the front driving wheel. When the machine 1 shall be used for cutting operations to depths which may correspond up to the total length of the front section 3 of the machine 1, the machine is conveniently provided with both the two cutter blades 7 and 8. If on the other hand, the required cutting depth is fairly small and amounts to not more than the radial distance from the front edge of the cutter blade to the front tip of the tool carrier, merely a single cutter blade may suffice. If it is the question of a flush cut to said small depth, the right hand cutter blade 7 is employed. On the opposite side of the tool carrier, the left hand cutter blade 8 in that case may be replaced by a driving wheel half without cutter blade or with a small blade which does not extend beyond the front tip of the tool carrier. In this connection, reference is made to the European Patent No 1 252 956, FIG. 8, and related parts of the patent description, the disclosure of which herewith also is incorporated in the present application by reference.

In a flush cut sawing machine it is not possible to achieve complete symmetry, without sacrificing other important features since the flush-cutting tool necessarily has to be laterally displaced relative to the rest of the machine. When designing the machine of the present invention it has, however, been an ambition to minimize the displacement, which may be referred to as the measure df mentioned in the foregoing. This, on the other hand, causes new design problems, because the tool carrier 11 will have to be safely attached to the rear section of the machine within a region of the front portion 6 having a desired small extension in the lateral direction, in which region also the front handle 13 shall be attached, and a power transmission between the motor shaft 24 as well as devices for tensioning the V-belt shall be accommodated. How this complex of problems has been solved shall now be explained with reference to FIG. 8 and FIG. 9.

With reference first to FIG. 8, a right angular gearing 35 is accommodated in a gear housing 36, which is attached to the motor housing. The gearing 35 consists of two cooperating bevel gear wheels mounted on their respective shafts, namely a first bevel gear wheel 37 on the motor shaft 24 and a second bevel gear wheel 38 on an output shaft 39. The axis of rotation 19 of the motor 17 and of the motor shaft 24 forms right angle to the axis of rotation 40 of the output shaft 39. The two axes 19 and 40 are in plane with one another and also with the axis of rotation 26 of the cutter blades 7, 8. The motor shaft 24 is mounted in a first bearing 41 in a gear housing wall 42 facing the motor 17, whereas an inner end of the output shaft 39 is mounted in a second bearing 43 in a protrusion 44 of the wall 48 of the gear housing 36 on the left hand side of said housing, and an outer end of the output shaft is mounted in a third bearing 45. Said third bearing 45 in turn is mounted in an output side cover 46 and secured in said cover by means of a flange 47. A driving pulley 49 for the V-belt 31 is attached to the outer end of the output shaft 40 by means of a screw 54 via a spacing sleeve 50.

Figure 9:
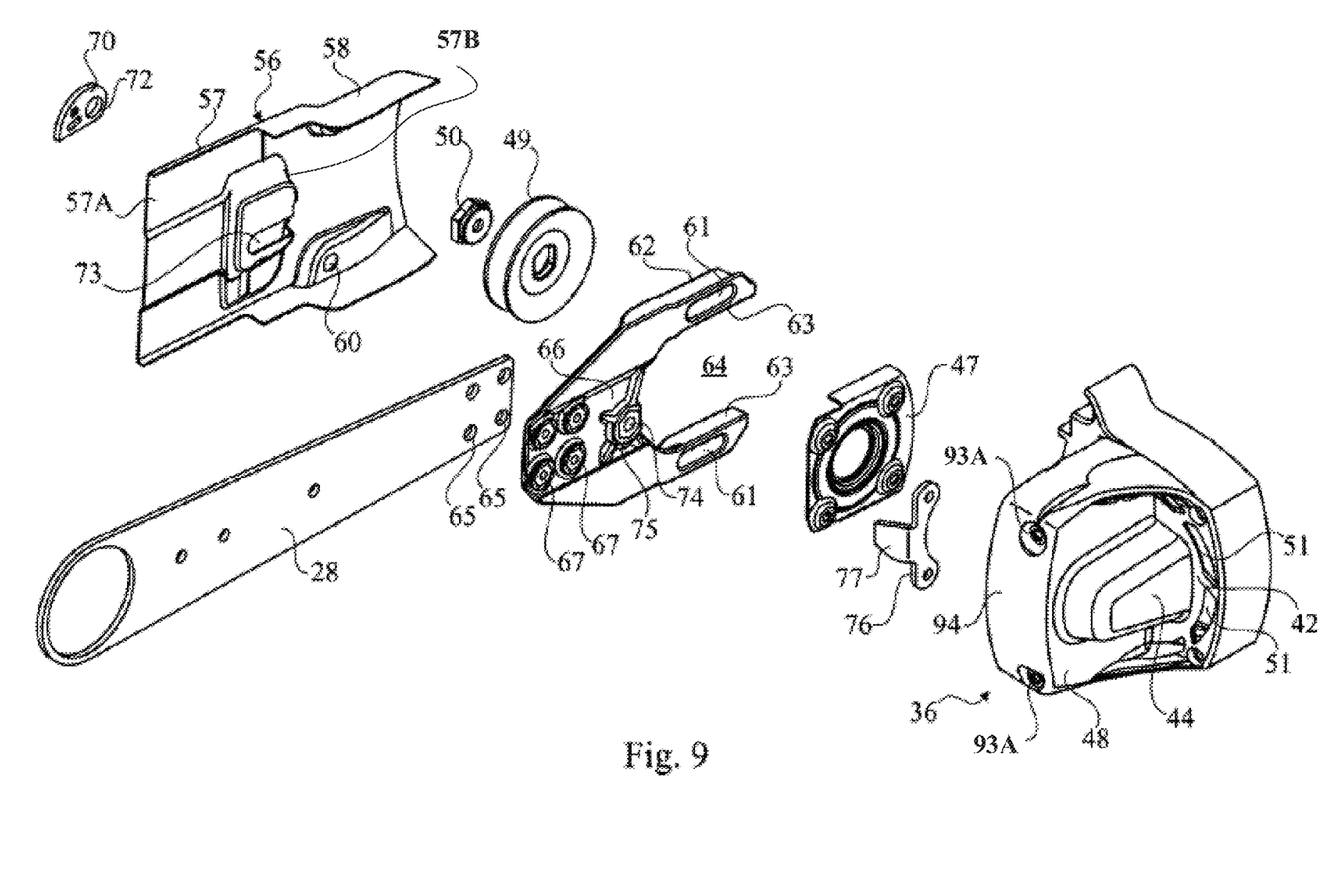
FIG. 9 is an exploded view illustrating a bar included in the tool carrier, various members related to the attachment of the tool carrier to the rear section of the machine, means for tensioning a V-belt, and parts of the power transmission as well as the housing thereof shown in FIG. 8.

The exterior of the gearing housing 36, including the walls 42 and 48, and the shape of the protrusion 44, are shown in FIG. 9, which also shows the distribution of a number of holes 51 in the wall 42 for the ventilation of the interior of the motor housing 18. A number of ventilation holes 52 are also provided in a right hand side wall section 53 of the gear housing 36.

The driving pulley 49 and a section of the V-belt 31 are covered by a panel made of sheet material, in this text denominated rear belt guard 56. Said rear belt guard 56 forms part of the front section 3, the mid-section 4, as well as of the rear section 2 of the machine 1 and forms an interconnection between those main parts of the machine. A front section 57 of the rear belt guard has a first, front portion 57A which is flat, having an outer surface coinciding with the plane of the outer side of the front part of the tool carrier 11, and a second portion having a cavity 57B, FIGS. 2, 8, and 9, at the rear of the first portion 57A. A rear section 58 of the belt guard 56 as a whole has a more complex shape and is connected to the gear housing 36 by means of screws 59 extending through two small, circular holes 60 in the rear belt guard 56 and also through two elongated holes 61 in a bar bracket 62.

The purpose of the bar bracket 62 is to form a connection between the bar 28, forming the central part of the tool carrier 11, and the gear housing 36, allowing the bar bracket 62 and the bar 28 to be moved in the longitudinal direction of the tool carrier 11 relative to the gear housing 36 and to the driving pulley 49. For the latter purpose, the two holes 61 have an elongated shape and are provided in each of two fingers 63 of the fork-like bracket 62. An open space between the finger-like protrusions 63 of bracket 62 is designated 64. The rear end of the bar 28 has four holes 65. In a front, laterally protruding part 66 of the bracket 62, four matching threaded holes 67 are provided for screw joining the bar 28 to the outer side of the bracket 62.

A V-belt tensioning eccentric 70 made of a flat piece of steel sheet is provided in the above mentioned cavity 57B in the front section 57 of the rear belt guard 56. The eccentric 70 is secured in the cavity by means of a screw 71, FIG. 2, which extends through a hole 72 in the eccentric 70 and through an elongated slot 73 in the bottom of cavity 57B and through a hole 74 in the protruding part 66 of the bar bracket 62 at the rear of the rear end of the bar 28. A nut, not shown, is accommodated in a seat 75 securing the screw 71 and hence the eccentric 70 to the bar bracket 62. Further, a device, denominated bracket tensioner 76 is secured by screws to the gear housing 36. A protruding nose portion 77 of the bracket tensioner extends through the slot 73 into the cavity 57B. In the bottom of the cavity 57B two different screw drive recesses are provided, one for a conventional flat tip screw driver and another one for a Torx screw driver. Normally, the bar bracket 62 is tightly secured by nuts against the gear housing 36 in cooperation with two screws 59, which extend through the holes 60 in the panel 56 and further through the elongated holes 61 in the bracket 62. If the nuts are eased, the bar bracket 62 can be displaced in the longitudinal direction by means of a screw driver, fitting in any of the screw drive recesses in the eccentric 70. By means of the fitting screw driver, the eccentric 70 is turned about the screw 71, urging the cam profile of the eccentric against the nose portion 77 of the bracket tensioner 76, which works as a counterstay, such that the eccentric 70 will force the bar bracket and hence the bar 28 to move in the longitudinal direction, tensioning the V-belt 31. Upon tensioning the V-belt, the bar bracket 62 can be refastened by said nuts in the new position in the elongated holes 61. It should be understood that the entire operation for tensioning the V-belt and securing the bar in a new position can be carried out from outside by means of the eccentric 70 and the nuts.

Figure 10:
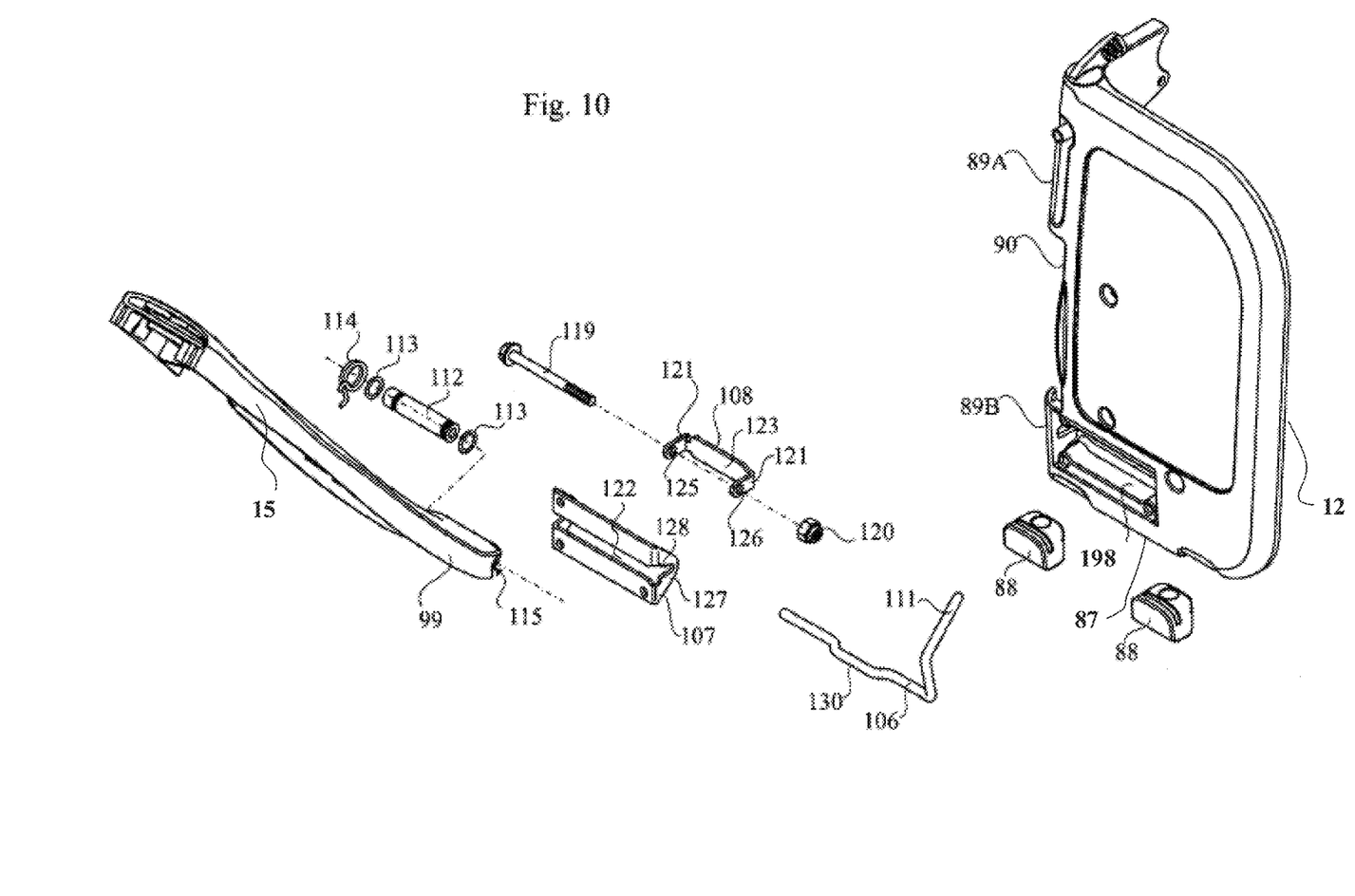
FIG. 10 is an exploded view illustrating guard components included in a mid section of the machine.

The shield 12 with the rear blade guard 15 and the front handle 13, which supports the shield, form an integrated unit from a functional point of view. The shield 12 and the rear blade guard 15, which is pivotally connected to the shield 12, together form the mid section 4 of the machine 1. The mid section 4 has quite a small extension when the blade guard is in upraised position, representing only about 3-4% of the total length of the machine 1. The front handle 13 is secured to the gear housing 36 via said support member 32 on the right hand side of the machine. A vertical left hand side section 79 of the front handle 13 is mounted via a connection piece 81, which is turned inwards, connected to the gear housing 36 on the bottom side thereof. The shield 12 basically has the shape of a rectangle with rounded top and bottom left corners 82 and 83, respectively, and is made of a strong plastic material. A straight top edge 84 and a straight left hand side edge 85, respective, extend slightly above and beyond the top and left hand side sections 33 and 79 of the front handle 13, respectively, while a bottom portion 86 with a straight bottom edge 87, on which there are provided two feet 88, form a support, allowing the machine 1 to rest on a horizontal ground. The right hand side of the shield has a recess 90, FIG. 10, accommodating the rearmost end of the tool carrier 11, FIG. 1 and FIG. 8, but sections 89A and 89B of the right hand side edge above and below the recess 90 are straight and extend close to the flush-cutting plane 21.

The shield 12 is connected to the front handle 13 through a broad wing member 91 forming an additional guard for the operator holding the machine with his left hand about the front handle 13. The wing member 91 is connected to the front handle 13 close to where the support member 32 is connected to the top portion 33 of the handle. The shield 12 is further connected to the front handle 13 through a strut 92 provided between the shield and the connection piece 81 in a lower part of the shield. But the shield 12 is also connected directly to the gear housing 36 by screws 93, FIG. 1, which extend into threaded screw holes 93A in a front portion 94 of the gear housing 36, which rests in a shallow cavity 95 on the rear side of the shield 12.

The rear blade guard 15 is made up of a number of separate components, which are connected to one another, including a flexible section 102 and a flexible top section 98, both flexible sections are made of a flexible polymeric material and are connected to a stiffer main section 99 which has sides which are aligned with the sides of the flexible top section 98, the main section 99 comprising left hand portion 101 which extends along the left hand side of the tool carrier 11.

According to an aspect of the invention, the rear blade guard 15 is not only pivotally connected to the lower portion 87 of the shield 12 but can also be displaced sideways relative to the shield 12 to make flush-cutting possible. For that purpose, all the various members are provided, which are shown in a lower, left part of FIG. 10. These members include a rocker 106, a seat 107, and a retainer 108. Further a recess, which can accommodate the seat 107 and the retainer 108 is provided in the front of the lower portion of the shield 12 and, on the opposite rear side, a hole 117, 118 is provided in each side wall of a protruding portion 110 corresponding to the recess on the front side, such that the rocker 106 can enter said recess from the rear side of the shield 12, be mounted in said holes 117, 118 and slide sideways in the holes. A lever on the rocker 106 is designated 111. Other members included in the assembly are a sleeve 112, two O-rings 113, and a torsion spring 114, which shall be accommodated in a through horizontal boring 115 in the lower end of the main section 99 of the rear blade guard 15. A screw and a nut are designated 119 and 120, respectively.

In the assembly consisting of the above described members, the sleeve 112, washers 113 and torsion spring 114 are inserted into the boring 115 in the blade guard 99. The retainer 108 is provided with two ears 121, which are entered through an elongated, horizontal slot 122 in the front wall of the seat 107. The web portion 123 of the retainer 108, however, is so broad that it can not pass through and is therefore retained on the rear side of the retainer 108. Now, the lower tip portion of the blade guard 99, which contains said boring 115 accommodating said members 112, 113 and 114, is entered between the two ears 121 of the retainer 108, which protrude beyond the front side of the seat 107. Next, the screw 119 is entered from the left with reference to FIG. 10 through a hole 125 in the first ear 121 and further on through the assembly, including the sleeve 112 and the spring 114, which is tightened in a mode per se, inside the bottom tip portion of blade guard 99, and finally through a hole 126 in the opposite ear 121. The nut 120 is mounted on the protruding end of screw 119, wherein the blade guard 99 has been pivotally secured to the seat 107. It can also be displaced sideways relative to the seat 107, because the seat 107 and the slot 122 in the seat are longer than the total length of the retainer 108, screw-head and nut 120. Now, ears 127 of seat 107 are moved into the recess 198, whereupon the seat 107 with the blade guard 99 secured thereto, is fastened to the shield 12 by means of screws. Finally, the rocker 106 is entered into the seat 107, through the first hole 117 on the rear side of the shield 12, then via recesses 128 in the ears 127 of seat 107 and finally through the opposite hole 118. A protruding central section 130 of the rocker 106 has a length corresponding to the distance between the ears 121 of the retainer 108 and is accommodated in the space defined sideways by the said two ears 121, rearwards by the web portion 123 and in the front direction by the tip portion of the blade guard section 99, which closes the slot 122. By means of the lever 111, the rocker 106 can be moved forth and back in the recess 198 between the ears 127 of the seat, said protruding section 130 of the rocker 106 causing the rear blade guard 15 to join the rocker lever in the displacement movement. The length of the displacement movements corresponds to the width of the second, finger-shaped portion 104 of the rear blade guard 15. The rocker 106 is released from and locked in locking end positions by turning the rocker by means of the lever 111.

Figures 5, 7:
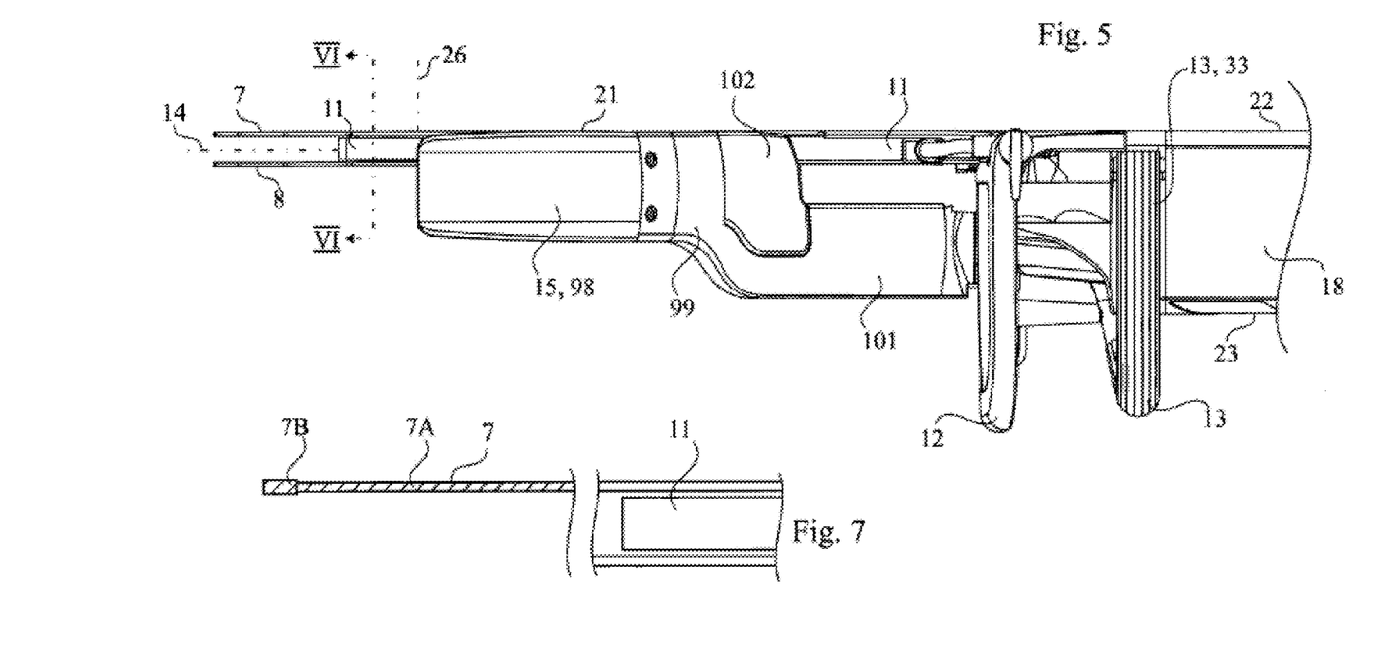
FIG. 5 shows the same machine as in FIG. 4 but prepared for flush-cutting.
FIG. 7 is a corresponding view of a machine provided with only one circular cutting tool.
Figure 6:
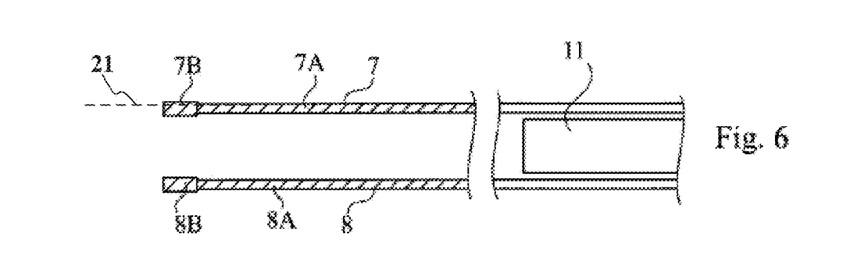
FIG. 6 is a view along the lines VI-VI in FIG. 5, schematically showing the front parts of the tools and the tool carrier of the machine provided with two circular cutting tools.

As has been mentioned already in the preamble of this description, the machine 1 of the present invention is a versatile tool which can be used for standard cutting operations particularly in the construction industry but also for special tasks, in the first place for flush-cutting operations. For standard cutting operations, the machine 1 is normally provided with two cutter blades 7, 8 and with the rear blade guard 15 arranged in the mode shown in all the drawings except FIG. 5. It is, however, also possible to use only one cutter blade 7, as is indicated in FIG. 7, at least when the cutting depth is comparatively small. Also, for flush-cutting operations, one or two cutter blades may be employed, but if the cutting depth is large, which it normally is in the construction industry, the machine 1 is provided with its two cutter blades 7, 8. For adapting the machine to flush-cutting, the rear blade guard 15 is moved to the left upon unlocking the rocker lever 106 by means of the lever 111. Then the rocker lever 106 is locked again in the new position. As is shown in FIG. 5, the rear blade guard 15 now does not hinder the machine from working flush against e.g. a wall or a floor for performing flush-cutting. For both kinds of operation, standard non-cutting operations as well as flush-cutting operations, the guard against the cutter blades 7, 8 is very good, due to the front blade guards 9, 10 in combination with the rear blade guard 15, whether the rear blade guard is in its normal position or moved aside. In the latter case, also the object against which the machine operates flush, e.g. a wall or a floor, plays the role as a guard against the cutter blades and it also forms a barrier against spatter in combination with the shield 12, which hinders saw dust and the like from hitting the operator or hitting the rear parts of the machine 1.

It is also possible to make narrow grooves e.g. in a floor flush against a wall, or vice versa, by means of the machine of the invention, provided with its two cutter blades 7, 8. Such grooves can be used for accommodating electrical or other conduits, and/or for the accommodation of borders, sealings and the like.

It should also be understood that the invention can be modified within the frame of the appending claims. For example, the rear tool guard 15 can be designed in other modes for allowing non-flush as well as flush-cutting operations without jeopardising its guard efficiency. For example, the right hand part of the guard may consist of a member which can be dismounted for flush-cutting operations, or be connected to the left hand part of the guard via a hinge, such that it can be folded aside or it may consist of a flexible material allowing it to be folded aside.

The invention claimed is:

1. A hand-held, hand-operated, cutting or sawing machine comprising:
   a front section and a rear section;
   the front section includes at least a first, disc-shaped cutter blade, which is rotary about an axis of rotation, said first cutter blade having a peripheral edge portion which is the working part of the first cutter blade, said first cutter blade having a first side defining a first plane, and a second side defining a second plane,
   said first cutter blade is rotatably mounted in a front end of an elongated tool carrier, said elongated tool carrier having a substantial shape of a flat bar having two opposite side walls which are parallel with said first and second sides of said first cutter blade,
   said front end further comprising an upper front blade guard and a lower front blade guard;
   a rear end of the elongated tool carrier is connected to said rear section of the machine at a location rearward of said first cutter blade,
   said first cutter blade is provided on a first side of a center plane of the front section, said second side of said first cutter blade facing the tool carrier,
   said rear section includes a motor that drives the first cutter blade via a power transmission, and said rear section further includes a housing, handles, and a control device trigger for operating the machine,
   said first plane does not intersect any component, besides the first cutter blade, included in said front or rear sections,
   a rear tool guard having a flush-cutting mode and a non-flush-cutting mode, and in the flush-cutting mode said first plane does not intersect the rear tool guard, but does intersect the rear tool guard in the non-flush-cutting mode,
   wherein the rear tool guard is connected to a mid-section of the machine, and said rear tool guard includes a lateral part which optionally can be maintained intersected by said first plane or be withdrawn from the first plane and from the region outside of the first plane, and wherein a lower end of the rear tool guard is pivotally connected to a bottom portion of a shield, and is displaceable in lateral directions by a rocker and a rocker lever on a rear side of said bottom portion of the shield.

2. Machine according to claim 1, wherein the rear tool guard is arranged to be displaced in said lateral directions sideways between the flush-cutting mode and the non-flush-cutting mode.

3. Machine according to claim 1, wherein a drive wheel half for rotatably supporting an optional, second disc-shaped, rotary cutter blade is provided on a second side of the center plane of the front section, said drive wheel half is provided with means for detachably securing said second disc-shaped cutter blade to said drive wheel half.

4. Machine according to claim 1, wherein the length of said rear section and the length of said front section are approximately equal.

5. Machine according to claim 1, wherein said handles include an elongated, longitudinal, rear handle near said first plane in a rear end of the machine's rear section and a transversal front handle near a front end of said rear section.

6. Machine according to claim 5, wherein a center plane of said elongated rear handle is parallel to said first plane and the center plane of said elongated rear handle is located at a lateral distance from the center plane of the front section, the center plane of the front section being defined by a longitudinal center of the elongated tool carrier, and parallel to the first plane and the second plane, a rear end of the rear handle is located at a longitudinal distance from said axis of rotation of said first cutter blade, and wherein the ratio between said lateral distance and said longitudinal distance amounts to less than 1/10.

7. Machine according to claim 6, wherein the ratio is less than 1/20.

8. Machine according to claim 1, wherein said rear section includes at least one side member with a thickness extending in a lateral direction to said first plane.

9. Machine according to claim 8, wherein said at least one side member has at least one flat side surface, the plane of which coincides with said first plane.

10. Machine according to claim 1, wherein the power transmission includes a motor shaft, a driving belt, a driving pulley that drives the driving belt, an output shaft mounted to said driving pulley, and an angular gearing that connects said motor shaft to said output shaft, and wherein the axes of rotation of the motor shaft, the output shaft and the first cutter define a common plane.

11. Machine according to claim 10, wherein the motor shaft extends in a longitudinal direction of the machine, and the angular gearing is a right-angular gearing.

12. Machine according to claim 10, wherein a driving wheel half that supports the first cutter blade is provided at the front end of the elongated tool carrier, and wherein a driving belt tensioner is provided for tensioning the driving belt by moving the elongated tool carrier forwards, said belt tensioner including an eccentric provided rotary in a cavity on a right-hand, flush-cutting side of the machine.

13. Machine according to claim 1, wherein said housing has a first side on the same side of said center plane of the front section as said first plane closely to said first plane, said first side of the housing facing said first plane, and said housing has a second side on the opposite side of said center plane.

14. Machine according to claim 1, wherein the shield hinders sawdust or cuttings from hitting the rear section, the shield is provided in a mid-section between the front section and the rear section and is not intersected by said first plane.

15. Machine according to claim 14, wherein the mid-section has a length in the longitudinal direction which is less than 5% of the total length of the machine.

16. Machine according to claim 1, wherein a tool assembly is provided in said front section including two disc-shaped coaxial cutter blades, namely said first cutter blade on a first side of the center plane of the tool carrier and a second cutter blade on the opposite, second side of said center plane, and that any plane defined by the sides of said second cutter blade intersects at least one component included in the rear section of the machine.

* * * * *